(12) United States Patent
Swiatowy

(10) Patent No.: US 8,961,077 B2
(45) Date of Patent: Feb. 24, 2015

(54) SEVERING AND BEVELING TOOL

(75) Inventor: Jeffrey Swiatowy, Crystal Lake, IL (US)

(73) Assignee: Illlinois Tool Works Inc., Glenview, IL (US)

( * ) Notice: Subject to any disclaimer, the term of this patent is extended or adjusted under 35 U.S.C. 154(b) by 748 days.

(21) Appl. No.: 12/909,296

(22) Filed: Oct. 21, 2010

(65) Prior Publication Data

US 2011/0097163 A1 Apr. 28, 2011

Related U.S. Application Data

(60) Provisional application No. 61/254,804, filed on Oct. 26, 2009.

(51) Int. Cl.
| B23B 31/10 | (2006.01) |
| B23C 3/00 | (2006.01) |
| B23C 5/26 | (2006.01) |
| B23C 5/10 | (2006.01) |

(52) U.S. Cl.
CPC . B23C 5/10 (2013.01); B23C 3/007 (2013.01); B23C 5/26 (2013.01); B23C 2220/16 (2013.01); B23C 2265/08 (2013.01)
USPC .............................................. 407/53; 407/54

(58) Field of Classification Search
USPC ...................... 407/40, 42, 53, 54, 34; 279/99; 408/224, 226
See application file for complete search history.

(56) References Cited

U.S. PATENT DOCUMENTS

| 190,115 | A | 5/1877 | Babcock et al. |
| 762,545 | A | 6/1904 | Merriam |
| 2,000,772 | A | 5/1935 | McGill |
| 2,147,438 | A | 2/1939 | Hassler |
| 2,257,619 | A | 9/1941 | Prill |
| 2,346,373 | A | 1/1942 | Fortier |
| 2,446,026 | A | 2/1946 | Ruby |
| 2,429,375 | A * | 10/1947 | Smith ........................... 279/102 |
| 2,600,481 | A | 6/1952 | Clyde |
| 2,705,515 | A * | 4/1955 | Walker .......................... 408/224 |
| 2,763,257 | A | 9/1956 | Asbury |
| 2,769,468 | A | 11/1956 | Swanson |
| 2,962,745 | A | 12/1960 | Pedersen |
| 3,071,903 | A | 1/1963 | Wing et al. |
| 3,852,917 | A | 12/1974 | McKown |
| 3,919,717 | A | 11/1975 | Cullen et al. |
| 4,007,705 | A | 2/1977 | Sherer et al. |
| 4,043,167 | A | 8/1977 | Koser |
| 4,086,732 | A | 5/1978 | Ramsey |
| 4,091,514 | A | 5/1978 | Motes-Conners et al. |
| 4,092,758 | A | 6/1978 | Horton et al. |
| 4,103,461 | A | 8/1978 | Besenbruch |
| 4,143,489 | A | 3/1979 | Sogner |

(Continued)

FOREIGN PATENT DOCUMENTS

| DE | G9408721.0 | 5/1994 |
| DE | 102008064081 | 7/2010 |

(Continued)

*Primary Examiner* — Will Fridie, Jr.

(74) *Attorney, Agent, or Firm* — Klintworth & Rozenblat IP LLC

(57) ABSTRACT

A tool for both severing the end of a pipe and beveling the cut end includes a spiral cutting mill having an elongate end received in the bore of a frustoconical shell cutter. The shell cutter is locked for rotation with the cutting mill such that a single tool has two cutting surfaces, one for severing a length of pipe and one for beveling the outer edge thereof.

24 Claims, 1 Drawing Sheet

(56) References Cited

U.S. PATENT DOCUMENTS

| | | | |
|---|---|---|---|
| 4,205,694 A | | 6/1980 | Thompson et al. |
| 4,445,248 A | | 5/1984 | Hait |
| 4,552,594 A | | 11/1985 | van Voskuilen et al. |
| 4,930,542 A | | 6/1990 | Winkle et al. |
| 5,070,654 A | | 12/1991 | Manqvist et al. |
| 5,070,656 A | | 12/1991 | Brogden |
| 5,136,969 A | | 8/1992 | Chapman |
| 5,199,226 A | | 4/1993 | Rose |
| 5,244,505 A | | 9/1993 | Allison et al. |
| 5,287,661 A | | 2/1994 | Benner |
| 5,482,410 A | * | 1/1996 | Chambers .................. 408/1 R |
| 5,496,206 A | | 3/1996 | Young |
| 5,615,696 A | | 4/1997 | Lawler |
| 5,616,068 A | | 4/1997 | Soderberg |
| 5,628,675 A | | 5/1997 | Brown et al. |
| 6,200,073 B1 | * | 3/2001 | Chung ........................ 407/53 |
| 6,200,078 B1 | * | 3/2001 | Kubota ....................... 409/74 |
| 6,241,590 B1 | | 6/2001 | Heijkenskjold |
| 6,347,914 B1 | * | 2/2002 | Boyle et al. ................. 408/240 |
| 6,453,899 B1 | | 9/2002 | Tselesin |
| 6,539,778 B2 | | 4/2003 | Tucker et al. |
| 6,709,206 B1 | | 3/2004 | Andes et al. |
| 7,690,970 B2 | | 4/2010 | Palushaj |
| 8,043,144 B2 | | 10/2011 | Palushaj |
| 2003/0172484 A1 | | 9/2003 | Lendabarker |
| 2005/0257431 A1 | | 11/2005 | Yamaguchi |
| 2008/0135232 A1 | | 6/2008 | Lawler et al. |
| 2010/0154153 A1 | | 6/2010 | Hooper et al. |
| 2010/0166516 A1 | | 7/2010 | Karow |
| 2010/0203814 A1 | | 8/2010 | Palushaj |
| 2013/0109282 A1 | | 5/2013 | Lewkoski et al. |

FOREIGN PATENT DOCUMENTS

| | | | |
|---|---|---|---|
| EP | 0353997 | | 2/1990 |
| EP | 0535431 | | 4/1993 |
| EP | 0687516 | A1 | 7/1995 |
| EP | 0687516 | Al | 7/1995 |
| EP | 2165804 | A2 | 3/2010 |
| GB | 2458174 | | 9/2009 |
| GB | 2458174 | A | 9/2009 |
| JP | 61252015 | | 11/1986 |
| JP | 62259759 | | 11/1987 |
| JP | 03055106 | | 3/1991 |
| JP | 0551421 | | 3/1993 |
| JP | 2001287113 | | 10/2001 |
| WO | 0058053 | | 10/2000 |
| WO | WO2006060204 | A2 | 6/2006 |
| WO | WO2007015256 | A1 | 2/2007 |
| WO | WO2007015256 | Al | 2/2007 |
| WO | 2007102744 | | 9/2007 |

\* cited by examiner

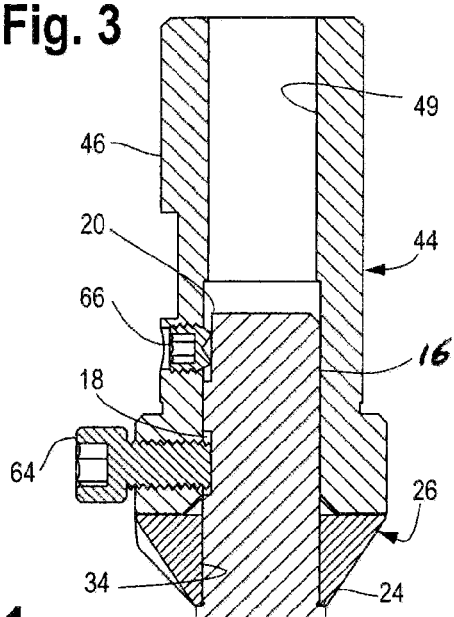
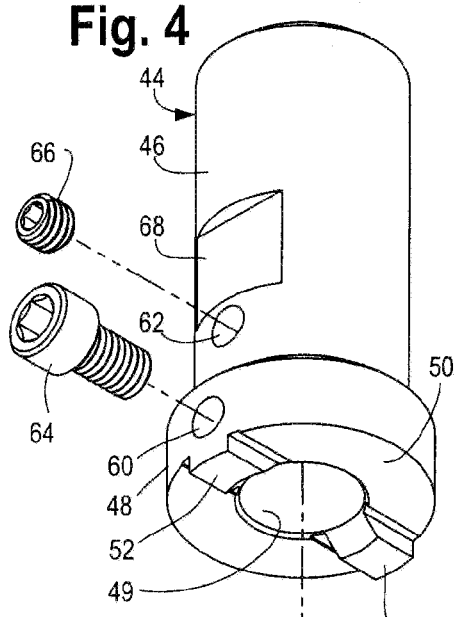
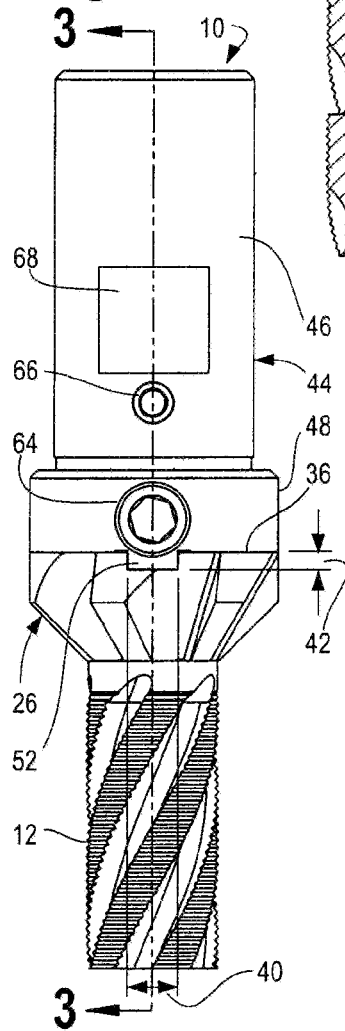
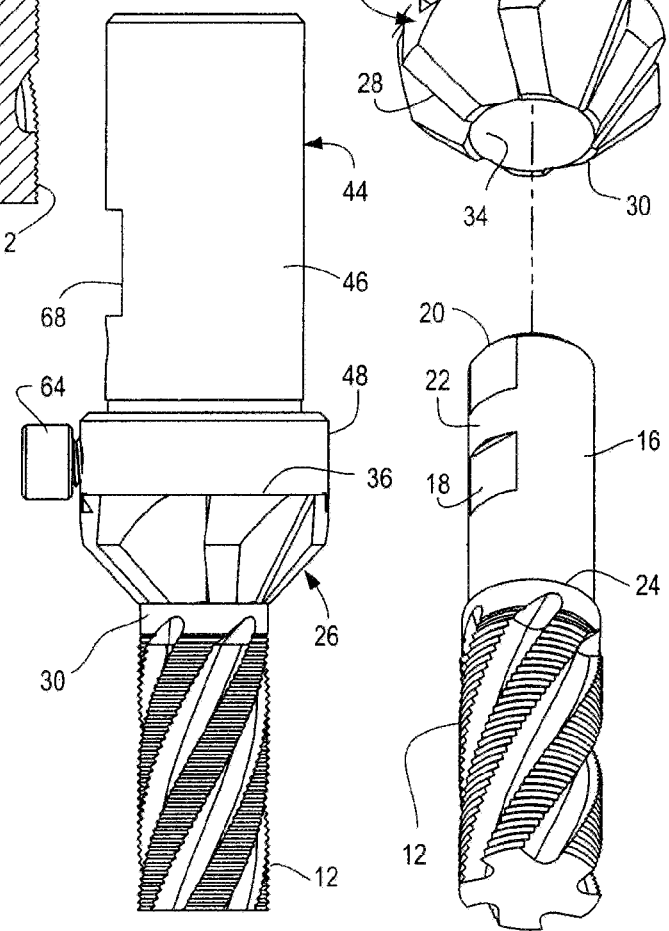

SEVERING AND BEVELING TOOL

The applicant claims priority from his provisional application filed Oct. 26, 2009 and assigned Ser. No. 61/254,804.

The present invention relates to a single tool suitable for both transversely cutting a length of pipe and for beveling the distal end of the pipe after the cut.

BACKGROUND OF THE INVENTION

With the advent of offshore drilling and the transportation of liquids such as gas and oil through underwater pipes robotically operated machines are needed to repair pipes that extend through deep waters. To repair a submerged pipe, the pipe must first be cut in two locations to remove a defective portion, after which the disconnected ends of the undamaged portions must be prepared to receive a repaired length of pipe. In order for a repair length to attach around one of the cut ends, the end of the pipe must be beveled. The machines necessary to repair a portion of defective pipe must therefore be capable of both cutting a length of pipe to leave an open end, and beveling the open end of the pipe. To minimize the number of machines that must be employed to repair a length of submerged pipe, it is desirable that a single machine be capable of performing more than one function.

Tools are currently available for severing a length of pipe and for beveling a length of pipe, but to the knowledge of the applicant no single tool is available for both severing and beveling a length of pipe. Accordingly, a machine cannot be fitted with a single tool to both sever and bevel a pipe without replacing the tool. There is therefore a need for such a multipurpose tool.

BRIEF DESCRIPTION OF THE INVENTION

Briefly, the present invention is embodied in a generally axially symmetric tool that includes a spiral end cutting mill having an elongate retaining end. A frustoconical shell cutter having a central bore slideably retains the elongate cutting end of the end cutting mill, and the shell cutter and end cutting mill are locked for rotation together to provide a single tool.

BRIEF DESCRIPTION OF THE DRAWINGS

A better understanding of the invention will be had after a reading of the following detailed description taken in conjunction with the drawings wherein:

FIG. 1 is a side elevational view of a combined tool in accordance with the present invention;

FIG. 2 is a second side elevation of the tool shown in FIG. 1 with the tool rotated around its axis ninety degrees;

FIG. 3 is a cross-sectional view of the tool shown in FIG. 1 taken through line 3-3 of FIG. 1; and FIG. 4 is an exploded view of the tool shown in FIG. 1.

DETAILED DESCRIPTION OF PREFERRED EMBODIMENT

Referring to FIGS. 1 through 4, a tool 10 in accordance with the present invention includes an elongate spiral end cutting mill 12 preferably made of a powdered metal so as to provide sufficient hardness to cut through the wall of a steel pipe. The cutting mill 12 has a generally cylindrical elongate mounting portion 16 coaxial with the milling end 12 and positioned on the mounting portion 16 are first and second spaced apart flats 18, 20 separated by a arcuate ridge 22. The diameter of the mounting portion 16 is a little smaller than the outer diameter of the cutting mill 12 forming an annular shoulder 24 between the mounting portion 16 and the cutting mill 12.

Coaxial with the cutting mill 12 is a frustoconical shell cutter 26. The shell cutter 26 is made of a hardened steel with angled cutting surfaces 28 that define a frustoconical surface that expands from a small diameter forward end 30 to a large diameter rearward end. The small end 30 preferably has a maximum diameter equal to the outer diameter of the cutting mill 12. Extending axially through the shell cutter 26 is a cylindrical transverse bore 34 that extends from a forward end to a rearward surface 36 thereof with the rearward surface 36 oriented perpendicular to the bore 34. Extending diametrically across the rearward surface 36 is a transverse slot 38 having a width 40 and a depth 42.

The tool 10 further includes a tubular tool holder 44 having a generally cylindrical outer surface 46 and a cylindrical radial flange 48 at the forward end thereof. The tubular tool holder 44 further has an axial cylindrical opening 49 having an inner diameter equal to the outer diameter of the mounting portion 16 of the cutting mill 12 and the mounting portion 16 is received within the cylindrical opening 49. At the forward end of the tool holder 44 is a planar transverse surface 50, and projecting forwardly from the transverse surface 50 on diametrically opposite sides of the cylindrical opening 49, are projections 52, 54 each of which has a height, which is equal to the depth 42 of the slot 38, and a width that is equal to the width 40 of the slot 38. The tool holder 48 also has first and second transverse threaded bores 60, 62 longitudinally aligned along the outer surface thereof for threadedly receiving locking screws 64, 66. Finally, the tool holder 44 has at least one flat 68 on the outer surface 64 thereof suitable to be engaged by a set screw in the tool holder of the machine, not shown, for locking the tool holder 44 for rotation with the machine.

To assemble the tool 10, the mounting portion 16 of the cutting mill 12 is first inserted into the small diameter end 30 of the shell cutter 26 until the small diameter end 30 abuts against the annular shoulder 24 of the mill cutter 12. The mounting portion 16 of the mill cutter 12 is then inserted into the cylindrical opening 48 of the tool holder 44. The shell cutter 26 is rotated with respect to the tool holder 44 until the projections 52, 54 of the tool holder 44 are received in the slot 38 of the shell cutter 26 thereby locking the shell cutter 26 for rotation with the tool holder 44. The cutting mill 12 is also rotated within the tool holder 44 until the flats 18, 20 are aligned immediately below the threaded bores 60, 62 of the tool holder 44. When the locking screws 64, 66 are inserted into the threaded bores 60, 62 and tightened against the flats 18, 20 the end cutting mill 12 is locked for rotation with the tool holder 44 as is the shell cutter 26. When the cylindrical outer surface 46 of the tool holder 44 is in turn inserted into the retainer of a machine, not shown, and a set screw, also not shown, on the machine is tightened against the flat 68 of the tool holder 44, both the cutting mill 12 and the shell cutter 26 will be locked to rotate with the machine.

A machine having the tool 10 locked in the retainer thereof can use the cutting mill 12 to make a transverse cut to sever a length of pipe and can thereafter use the shell cutter 26 to bevel the cut end of the pipe. Accordingly, the single tool 10 can both cut and bevel a length of pipe without requiring replacement of a tool.

While the present invention has been described with respect to a single embodiment, it will be appreciated that many modifications and variations can be made without departing from the spirit and scope of the invention. It is therefore the intent of the appended claims to cover all such modifications and variations that fall within the spirit and scope of the invention.

What is claimed:

1. A tool comprising
a spiral end cutting mill, said spiral end cutting mill having an elongate retaining end;
a frustoconical shell cutter, said frustoconical shell cutter having a central bore, said retaining end received in said central bore, and said shell cutter locked to said cutting mill for rotation therewith;
a tubular retainer having a central opening, said retaining end also received in said tubular retainer;
a projection on one of said tubular retainer and said shell cutter;
a groove in the other of said tubular retainer and said shell cutter, said projection received in said groove wherein said shell cutter is locked for rotation with said retainer;
a flat on said retaining end;
a set screw in said retainer, said set screw contacting said flat for locking said cutting mill to said retainer;
wherein the projection has a height equal to a depth of the groove, and wherein the projection has a projection width equal to a groove width of the groove;
wherein the projection is a first projection and the groove is a first groove, the tool further comprising:
a second projection on one of said tubular retainer and said shell cutter; and
a second groove in the other of said tubular retainer and said shell cutter, wherein said second projection is received in the second groove;
wherein the second projection has a second height equal to a second depth of the second groove, and wherein the second projection has a second projection width equal to a second groove width of the second groove.

2. The tool of claim 1, wherein said spiral end cutting mill is made of a powdered metal.

3. The tool of claim 1, wherein said spiral end cutting mill includes a plurality of cutting flutes formed on an outer surface of the spiral end cutting mill and positioned around a central axis of the spiral end cutting mill.

4. The tool of claim 1, wherein the spiral end cutting mill includes a milling end having a first diameter and a mounting portion having a second diameter, wherein the first diameter of the milling end is larger than the second diameter of the mounting portion to form a shoulder between the milling end and the mounting portion.

5. The tool of claim 4, wherein the frustoconical shell cutter includes a small diameter end and a large diameter end, and wherein the small diameter end abuts the shoulder of the spiral end cutting mill.

6. The tool of claim 5, wherein the large diameter end of the frustoconical shell cutter abuts an end surface of the tubular retainer, wherein the frustoconical shell cutter is trapped between the shoulder of the spiral end cutting mill and the end surface of the tubular retainer to inhibit axial movement of the frustoconical shell cutter relative to the spiral end cutting mill.

7. The tool of claim 5, wherein the small diameter end of the frustoconical shell cutter is equal in size to the first diameter of the milling end.

8. A tool comprising
a spiral end cutting mill, said spiral end cutting mill having an elongate retaining end;
a frustoconical shell cutter, said frustoconical shell cutter having a central bore, said retaining end received in said central bore, and said shell cutter locked to said cutting mill for rotation therewith;
a tubular retainer having a central opening, said retaining end also received in said tubular retainer;
a projection on one of said tubular retainer and said shell cutter;
a groove in the other of said tubular retainer and said shell cutter, said projection received in said groove wherein said shell cutter is locked for rotation with said retainer;
a flat on said retaining end;
a set screw in said retainer, said set screw contacting said flat for locking said cutting mill to said retainer;
wherein the flat is a first flat and the set screw is a first set screw, the tool further comprising a second flat on said retaining end and a second set screw contacting the second flat, wherein the tubular retainer has a first bore for receiving the first set screw and a second bore for receiving the second set screw.

9. The tool of claim 8, wherein the spiral end cutting mill includes a milling end having a first diameter and a mounting portion having a second diameter, wherein the first diameter of the milling end is larger than the second diameter of the mounting portion to form a shoulder between the milling end and the mounting portion.

10. The tool of claim 9, wherein the frustoconical shell cutter includes a small diameter end and a large diameter end, and wherein the small diameter end abuts the shoulder of the spiral end cutting mill.

11. The tool of claim 10, wherein the large diameter end of the frustoconical shell cutter abuts an end surface of the tubular retainer, wherein the frustoconical shell cutter is trapped between the shoulder of the spiral end cutting mill and the end surface of the tubular retainer to inhibit axial movement of the frustoconical shell cutter relative to the spiral end cutting mill.

12. The tool of claim 10, wherein the small diameter end of the frustoconical shell cutter is equal in size to the first diameter of the milling end.

13. A tool comprising
a spiral end cutting mill, said spiral end cutting mill having an elongate retaining end;
a frustoconical shell cutter having a central bore, said retaining end received in said central bore;
a tubular retainer having a central opening, said retaining end also received in said tubular retainer, and said end cutting mill and said shell cutter locked for rotation with said tubular retainer;
a projection on one of said tubular retainer and said shell cutter;
a groove in the other of said tubular retainer and said shell cutter, said projection received in said groove wherein said shell cutter is locked for rotation with said retainer;
a flat on said retaining end;
a set screw in said retainer, said set screw contacting said flat for locking said cutting mill to said retainer;
wherein the projection has a height equal to a depth of the groove, and wherein the projection has a projection width equal to a groove width of the groove;
wherein the projection is a first projection and the groove is a first groove, the tool further comprising:
a second projection on one of said tubular retainer and said shell cutter; and
a second groove in the other of said tubular retainer and said shell cutter, wherein said second projection is received in the second groove;
wherein the second projection has a second height equal to a second depth of the second groove, and wherein the second projection has a second projection width equal to a second groove width of the second groove.

14. The tool of claim 13, wherein said spiral end cutting mill includes a plurality of cutting flutes formed on an outer surface of the spiral end cutting mill and positioned around a central axis of the spiral end cutting mill.

15. The tool of claim 14, wherein said spiral end cutting mill is made of a powdered metal.

16. The tool of claim 13, wherein the spiral end cutting mill includes a milling end having a first diameter and a mounting portion having a second diameter, wherein the first diameter of the milling end is larger than the second diameter of the mounting portion to form a shoulder between the milling end and the mounting portion.

17. The tool of claim 16, wherein the frustoconical shell cutter includes a small diameter end and a large diameter end, and wherein the small diameter end abuts the shoulder of the spiral end cutting mill.

18. The tool of claim 17, wherein the large diameter end of the frustoconical shell cutter abuts an end surface of the tubular retainer, wherein the frustoconical shell cutter is trapped between the shoulder of the spiral end cutting mill and the end surface of the tubular retainer to inhibit axial movement of the frustoconical shell cutter relative to the spiral end cutting mill.

19. The tool of claim 17, wherein the small diameter end of the frustoconical shell cutter is equal in size to the first diameter of the milling end.

20. A tool comprising
a spiral end cutting mill, said spiral end cutting mill having an elongate retaining end;
a frustoconical shell cutter having a central bore, said retaining end received in said central bore;
a tubular retainer having a central opening, said retaining end also received in said tubular retainer, and said end cutting mill and said shell cutter locked for rotation with said tubular retainer;
a projection on one of said tubular retainer and said shell cutter;
a groove in the other of said tubular retainer and said shell cutter, said projection received in said groove wherein said shell cutter is locked for rotation with said retainer;
a flat on said retaining end;
a set screw in said retainer, said set screw contacting said flat for locking said cutting mill to said retainer;
wherein the flat is a first flat and the set screw is a first set screw, the tool further comprising a second flat on said retaining end and a second set screw contacting the second flat, wherein the tubular retainer has a first bore for receiving the first set screw and a second bore for receiving the second set screw.

21. The tool of claim 20, wherein the spiral end cutting mill includes a milling end having a first diameter and a mounting portion having a second diameter, wherein the first diameter of the milling end is larger than the second diameter of the mounting portion to form a shoulder between the milling end and the mounting portion.

22. The tool of claim 21, wherein the frustoconical shell cutter includes a small diameter end and a large diameter end, and wherein the small diameter end abuts the shoulder of the spiral end cutting mill.

23. The tool of claim 22, wherein the large diameter end of the frustoconical shell cutter abuts an end surface of the tubular retainer, wherein the frustoconical shell cutter is trapped between the shoulder of the spiral end cutting mill and the end surface of the tubular retainer to inhibit axial movement of the frustoconical shell cutter relative to the spiral end cutting mill.

24. The tool of claim 22, wherein the small diameter end of the frustoconical shell cutter is equal in size to the first diameter of the milling end.

* * * * *